US012304242B2

(12) United States Patent
Wallace et al.

(10) Patent No.: US 12,304,242 B2
(45) Date of Patent: *May 20, 2025

(54) AERODYNAMIC WHEEL COVER MOUNTING DESIGN

(71) Applicant: HOWMET AEROSPACE INC., Pittsburgh, PA (US)

(72) Inventors: Spencer Wallace, Broadview Heights, OH (US); Matt Brest, Hudson, OH (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 1120 days.

This patent is subject to a terminal disclaimer.

(21) Appl. No.: 17/263,827

(22) PCT Filed: May 28, 2019

(86) PCT No.: PCT/US2019/034103
§ 371 (c)(1),
(2) Date: Jan. 27, 2021

(87) PCT Pub. No.: WO2020/023107
PCT Pub. Date: Jan. 30, 2020

(65) Prior Publication Data
US 2021/0291586 A1 Sep. 23, 2021

Related U.S. Application Data

(60) Provisional application No. 62/711,292, filed on Jul. 27, 2018.

(51) Int. Cl.
*B60B 7/06* (2006.01)
*B60B 7/12* (2006.01)

(52) U.S. Cl.
CPC ............... *B60B 7/063* (2013.01); *B60B 7/12* (2013.01); *B60B 2320/10* (2013.01); *B60B 2900/1216* (2013.01); *B60B 2900/311* (2013.01)

(58) Field of Classification Search
CPC ....... B60B 2900/1216; B60B 2900/311; B60B 2320/10; B60B 7/12; B60B 7/063
See application file for complete search history.

(56) References Cited

U.S. PATENT DOCUMENTS 4,917,441 A * 4/1990 Iida .......................... B60B 7/08
301/37.35
5,639,146 A 6/1997 Chiu
(Continued)

FOREIGN PATENT DOCUMENTS

JP 2010018097 A 1/2010
KR 200343918 Y1 3/2004

OTHER PUBLICATIONS

International Search Report related to Application No. PCT/US2019/034103 reported on Sep. 11, 2019.

*Primary Examiner* — Jason R Bellinger
(74) *Attorney, Agent, or Firm* — Greenberg Traurig, LLP

(57) ABSTRACT

A wheel cover assembly for a vehicle wheel may include a cover body having a cover body outer surface, a cover body inner surface, and a cover body outer edge having an outer diameter that is greater than an inner diameter of a stiffener rib extending inward from an inner surface of the wheel rim and less than an inner diameter of an open end flange of the wheel rim. The wheel cover assembly may further include a cover mounting mechanism operatively connected to the cover body and having a locking position wherein the cover mounting mechanism engages the stiffener rib when the cover body inner surface is facing and engaging the stiffener rib and a cover locking position wherein the cover mounting (Continued)

mechanism engages the stiffener rib to secure the wheel cover assembly to the vehicle wheel.

4 Claims, 11 Drawing Sheets

(56) References Cited

U.S. PATENT DOCUMENTS

| | | | |
|---|---|---|---|
| 7,448,695 B1* | 11/2008 | Wolf | B60B 7/08 |
| | | | 301/37.35 |
| 11,529,826 B2* | 12/2022 | Wallace | B60B 7/12 |
| 2005/0012383 A1* | 1/2005 | Hsieh | B60B 7/14 |
| | | | 301/37.102 |
| 2008/0036285 A1 | 2/2008 | Davis et al. | |
| 2015/0108825 A1 | 4/2015 | Wang | |

* cited by examiner

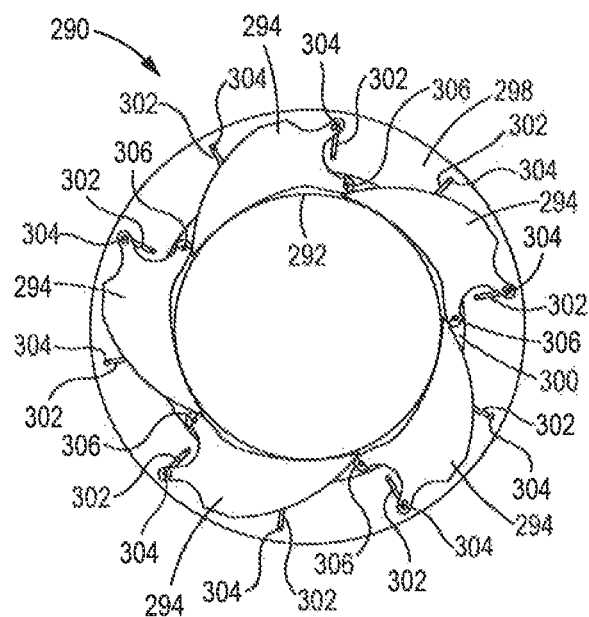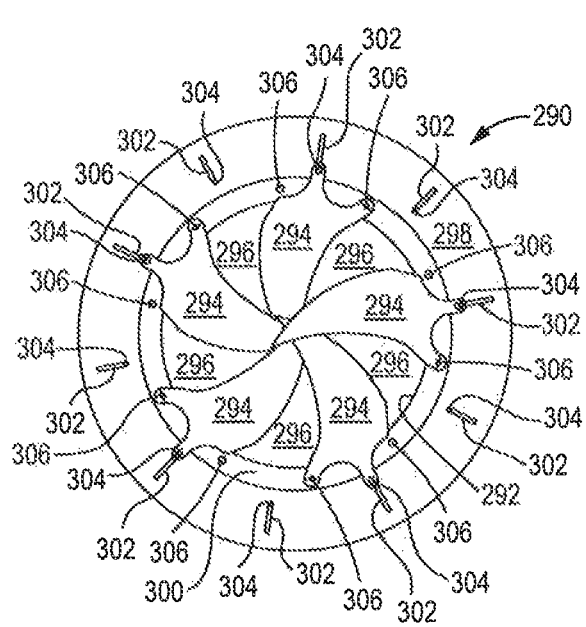
FIG. 13a    FIG. 13b
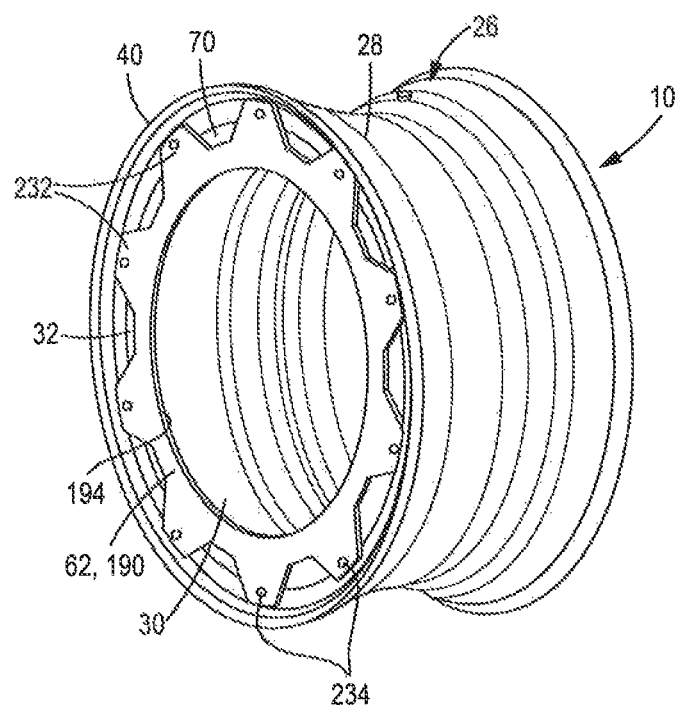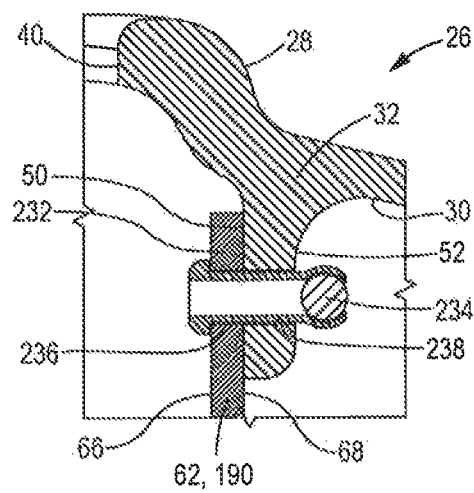
FIG. 14a    FIG. 14b

AERODYNAMIC WHEEL COVER MOUNTING DESIGN

TECHNICAL FIELD

The present disclosure relates generally to vehicle wheels and, more particularly, to designs for mounting aerodynamic wheel cover assemblies to wheel rims having stiffener ribs on inner surfaces of wheel rims of the vehicle wheels.

BACKGROUND

Conventionally, vehicle wheels have wheel rims with mounting flanges for mounting the vehicle wheel to the vehicle hub. The wheel rims are annular and often have an open end opposite the mounting flange and on the outboard side of the vehicle wheel. The shape of the wheel rim and the outboard open end can result in a cavity within the wheel rim and an aerodynamic discontinuity that exposes the interior of wheel rim to the airstream flow past the vehicle and can create noise and drag at highway speeds that are undesirable and can reduce the fuel efficiency of the vehicle.

SUMMARY OF THE DISCLOSURE

In one aspect of the present disclosure, a wheel cover assembly for a vehicle wheel having a wheel rim is disclosed. The wheel cover assembly may include a cover body having a cover body outer surface, a cover body inner surface opposite the cover body outer surface, and a cover body outer edge having a cover body outer diameter that is greater than a rib inner diameter of a stiffener rib extending inward from a rim inner surface of the wheel rim and less than an open end flange inner diameter of an open end flange of the wheel rim. The wheel cover assembly may further include a cover mounting mechanism operatively connected to the cover body and having a locking position wherein the cover mounting mechanism engages the stiffener rib when the cover body inner surface is facing and engaging the stiffener rib and a cover locking position wherein the cover mounting mechanism engages the stiffener rib to retain the stiffener rib between the cover mounting mechanism and the cover body and secure the wheel cover assembly to the vehicle wheel.

In another aspect of the present disclosure, a wheel cover assembly for a vehicle wheel having a wheel rim is disclosed. The wheel cover assembly may include a cover body having a cover body outer surface, a cover body inner surface opposite the cover body outer surface, and a cover body outer edge having a cover body outer diameter that is greater than a rib inner diameter of a stiffener rib extending inward from a rim inner surface of the wheel rim and less than an open end flange inner diameter of an open end flange of the wheel rim. The wheel cover assembly may further include a cover mounting mechanism operatively connected to the cover body and having a plurality of rib engaging elements disposed on the side of the cover body inner surface and circumferentially spaced about the cover body inner surface proximate the cover body outer edge, wherein the plurality of rib engaging elements define a cover mounting mechanism outer diameter that is greater than the rib inner diameter when the plurality of rib engaging elements are disposed in a rib engaging position and is less than the rib inner diameter when plurality of rib engaging elements are disposed in a rib disengaging position, and wherein the plurality of rib engaging elements are movable between the rib engaging position to engage the stiffener rib and attach the wheel cover assembly to the wheel rim and the rib disengaging position to disengage the wheel cover assembly from the wheel rim.

In some embodiment, the cover mounting mechanism comprises a plurality of locking arms extending from the cover body inner surface and circumferentially spaced about the cover body inner surface proximate the cover body outer edge. Each locking arm may include a locking arm body extending from the cover body inner surface and having a body proximal end connected to the cover body inner surface and a body distal end opposite the body proximal end, and a locking arm detent extending radially outward from the locking arm body proximate the body distal end. The locking arm detents define a cover mounting mechanism outer diameter that is greater than the rib inner diameter, and wherein the locking arm bodies deflect radially inward when the locking arm detents are engaged by the stiffener rib and deflect radially outward when the locking arm detents are disposed on an opposite side of the stiffener rib from the cover body so that the stiffener rib is retained between the locking arm detents and the cover body inner surface. In other embodiments, the wheel cover assembly may include a tension ring having an annular shape and engaging a radial inner surface of each locking arm body and biasing the locking arm bodies radially outward. In further embodiments, the plurality of locking arms are integrally formed with the cover body as a single unitary component of the wheel cover assembly.

In some embodiments, the stiffener rib has a plurality of rib holes circumferentially spaced about and extending through the stiffener rib from the rib outward face to the rib inward face. The cover body has a plurality of fastening tab holes circumferentially spaced about and extending through the cover body from the cover body outer surface to the cover body inner surface proximate the cover body outer edge, and the cover mounting mechanism comprises a plurality of mechanical connection hardware with each of the plurality of mechanical connection hardware extending through one of the plurality of rib holes and a corresponding one of the plurality of fastening tab holes to secure the wheel cover assembly to the vehicle wheel.

In some embodiments, the cover body has a plurality of latch recesses defined in the cover body outer surface and circumferentially spaced about the cover body outer surface proximate the cover body outer edge, with each latch recess having a latch opening extending through the cover body from the latch recess to the cover body inner surface. The cover mounting mechanism comprises a plurality of locking latches, each locking latch associated with a corresponding latch recess and having a latch arm on the side of the cover body outer surface and a latch finger extending through the latch opening to the side of the cover body inner surface. Each locking latch is operatively connected to the cover body so that the locking latch moves between a latch unlocked position where the latch finger does not engage the stiffener rib when the cover body inner surface is facing: and engaging the stiffener rib, and a latch locked position where the latch finger engages the stiffener rib when the cover body inner surface is facing and engaging the stiffener rib to retain the stiffener rib between the latch finger and the cover body inner surface. In further embodiments, each locking latch is pivotally connected to the cover body and rotates about a locking latch axis that is in a plane of the cover body.

In some embodiments, the cover body has a plurality of latching pin slots extending through the cover body from the cover body outer surface to the cover body inner surface and circumferentially spaced about the cover body outer surface proximate the cover body outer edge, each latching pin slot being elongated in a radial direction. The cover mounting mechanism comprises a plurality of latching pin assemblies, with each latching pin assembly corresponding to one of the plurality of latching pin slots and may include a latching pin extending through the latching pin slot with a latching pin tab end extending from the cover body outer surface, a latching pin finger coupled to the latching pin at a latching pin finger end opposite the latching pin tab end, and a latching pin mounting bracket mounted to the cover body proximate the latching pin slot, with the latching pin mounting bracket receiving the latching pin and constraining the latching pin to move between a latching pin unlocked position where the latching pin finger does not engage the stiffener rib when the cover body inner surface is facing and engaging the stiffener rib, and a latching pin locked position where the latching pin finger engages the stiffener rib when the cover body inner surface is facing and engaging the stiffener rib to retain the stiffener rib between the latching pin finger and the cover body inner surface. Each latching pin assembly may further include a latching pin spring engaging the latching pin and biasing the latching pin toward the latching pin locked position. In further embodiments, each latching pin finger comprises a finger camming surface, and the latching pin moves radially inward against a biasing force of the latching pin spring when the finger camming surface is engaged by the stiffener rib and moves radially outward when the latching pin finger is disposed on an opposite side of the stiffener rib from the cover body so that the stiffener rib is retained between the latching pin finger and the cover body inner surface.

In a further aspect of the present disclosure, a method for mounting a wheel cover assembly to a vehicle wheel having a wheel rim is disclosed. The method for mounting the wheel cover assembly may include positioning a cover body of the wheel cover assembly proximate a stiffener rib extending radially inward from a rim inner surface of the wheel rim, and engaging the stiffener rib with a cover mounting mechanism when the cover body is facing and engaging the stiffener rib to retain the stiffener rib between the cover mounting mechanism and the cover body to secure the wheel cover assembly to the vehicle wheel.

In some embodiments, the cover mounting mechanism comprises a plurality of locking arm bodies extending from the cover body proximate a cover body outer edge, each locking arm body having a locking arm detent extending radially outward from the locking arm body, and engaging the stiffener rib may include forcing the locking arm detents past the stiffener rib so that the locking arm detents are disposed on an opposite side of the stiffener rib from the cover body and engage the stiffener rib.

In some embodiments, engaging the stiffener rib may include moving latch arms mounted on the cover body to latch unlocked positions where latch fingers of the latch arms do not engage the stiffener rib when the cover body is facing and engaging the stiffener rib, inserting the latch fingers of the latch arms past the stiffener rib, and moving the latch arms to latch locked positions where the latch fingers engage the stiffener rib when the cover body is facing and engaging the stiffener rib to retain the stiffener rib between the latch fingers and the cover body. In further embodiments, moving the latch arms may include rotating the latch arms between the latch unlocked positions and the latch locked positions.

In some embodiments, the cover mounting mechanism may include a plurality of latching pins extending through the cover body proximate a cover body outer edge and slidably mounted to the cover body to move radially between a latching pin locked position and a latching pin unlocked position, each latching pin having a latching pin tab end extending from a cover body outer surface and a latching pin finger end extending from a cover body inner surface and having a latching pin finger mounted thereon. The latching pin may be biased toward the latching pin locked position by a latching pin spring, and engaging the stiffener rib may include moving the plurality of latching pins radially inward toward the latching pin unlocked position against a biasing force of the latching pin spring, inserting the latching pin fingers past the stiffener rib, and releasing the plurality of latching pins to allow the plurality of latching pins to move to the latching pin locked position where the latching pin fingers engage the stiffener rib when the cover body inner surface is facing and engaging the stiffener rib to retain the stiffener rib between the latching pin fingers and the cover body inner surface.

Additional aspects are defined by the claims of this patent.

BRIEF DESCRIPTION OF THE DRAWING

FIG. 6b is an enlarged isometric view of a portion of the wheel cover assembly of FIG. 6a;

FIG. 6c is an enlarged view of a portion of the wheel rim of FIG. 1 and a corresponding portion of the wheel cover assembly of FIG. 6a;

FIG. 7b is an enlarged view of a portion of the wheel rim of FIG. 1 and a corresponding portion of the wheel cover assembly of FIG. 7a;

FIG. 13a is a side view of an eighth embodiment of a cover body in accordance with the present disclosure in an open position FIG. 13b is the side view of the cover body of FIG. 13a in a closed position;

FIG. 14a is an exploded view of the wheel rim of FIG. 1 and a ninth embodiment of a wheel cover assembly in accordance with the present disclosure mounted on the wheel rim of FIG. 1

FIG. 14b is an enlarged view of a portion of the wheel rim of FIG. 1 and a corresponding portion of the wheel cover assembly of FIG. 14a mounted to the wheel rim;

DETAILED DESCRIPTION

Figure 2:
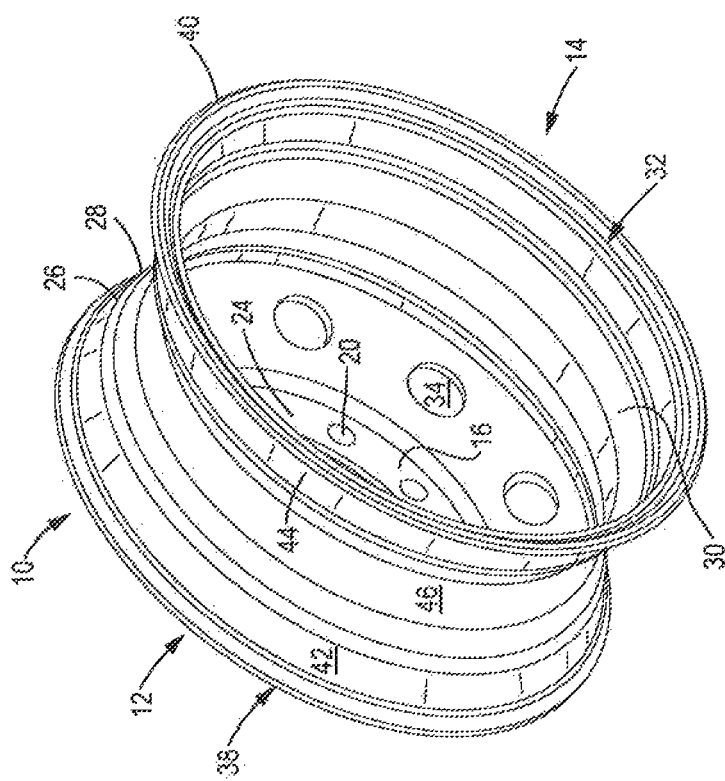
FIG. 2 is a perspective view from an open end of the wheel rim of FIG. 1.
Figure 1:
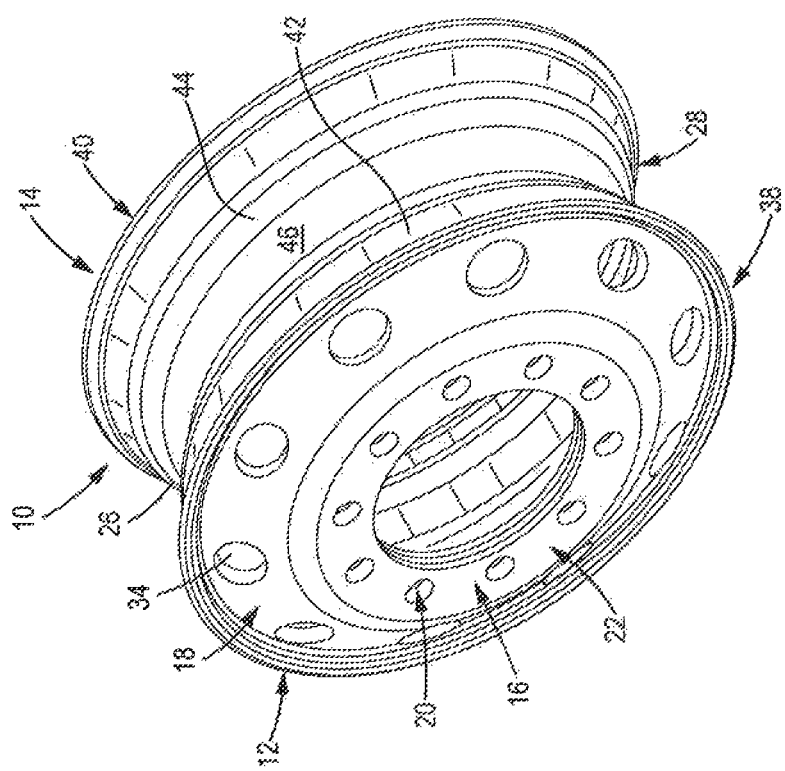
FIG. 1 is a perspective view from a disc or closed end of a wheel rim of a vehicle in which wheel cover assemblies in accordance with the present disclosure may be implemented.
Figure 4:
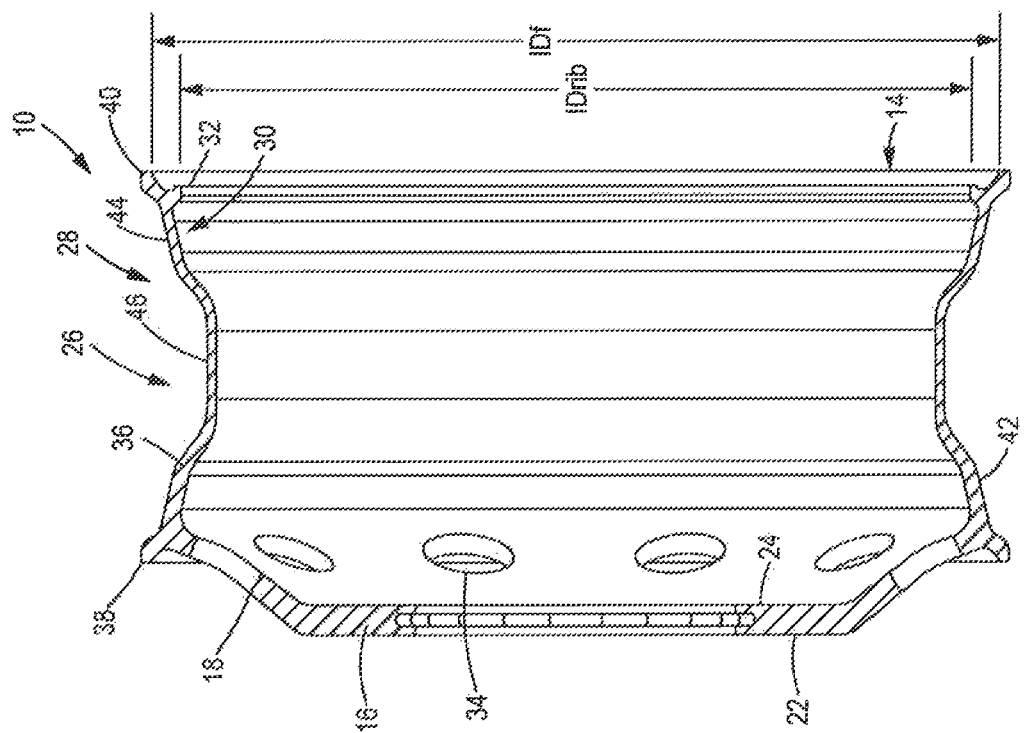
FIG. 4 is a cross-sectional view of the wheel rim of FIG. 1 taken through line 4-4 of FIG. 3.
Figure 3:
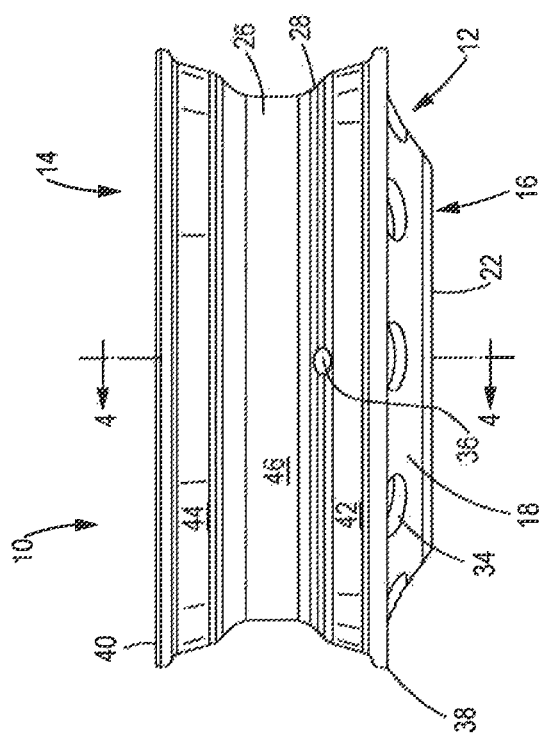
FIG. 3 is a side view of the wheel rim of FIG. 1.
Figure 5A:
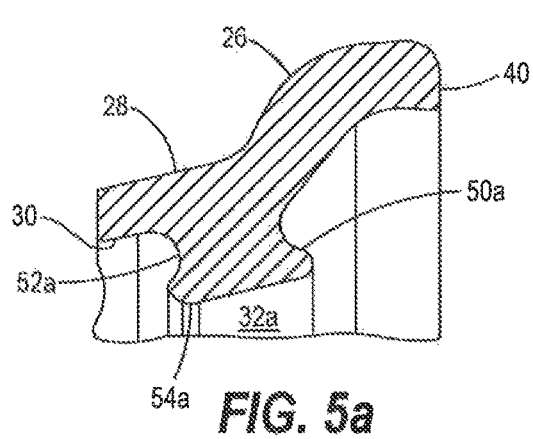
FIGS. 5a-5g are enlarged cross-sectional views of portions of the wheel rim of FIG. 1 illustrating various configurations of a stiffener rib on a rib inner surface of the wheel rim.
Figure 5B:
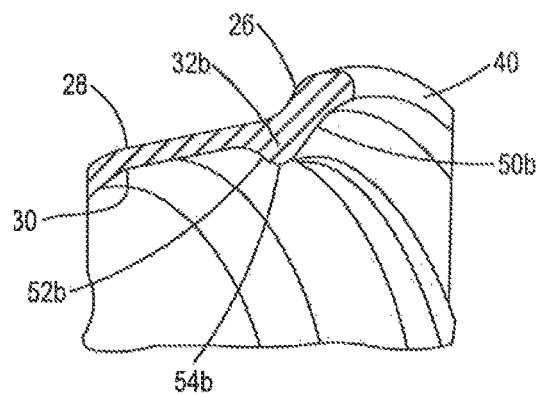
Figure 5C:
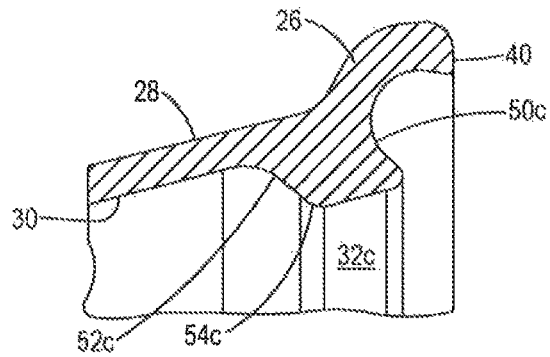
Figure 5D:
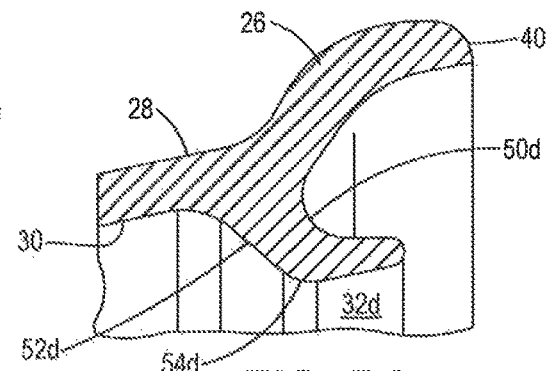
Figure 5E:
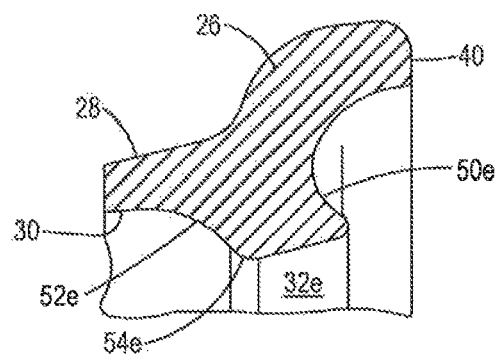
Figure 5F:
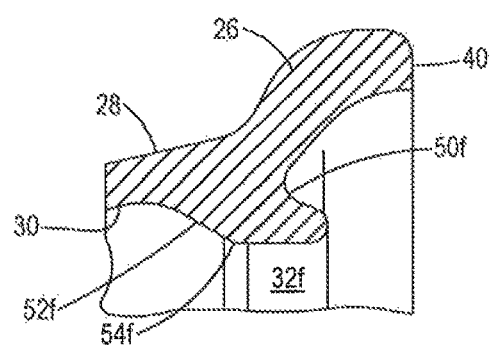
Figure 5G:
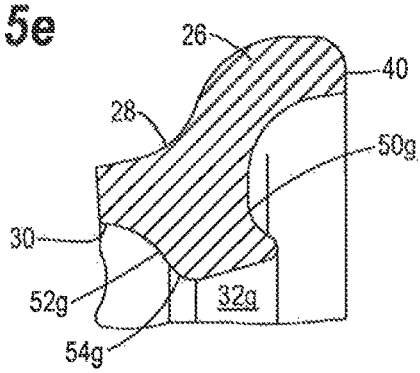

FIGS. 1-4 illustrate a vehicle wheel 10 having a disc end 12 and an opposing open end 14 at which an aerodynamic wheel cover assembly in accordance with various embodiments of the present disclosure may be mounted. The vehicle wheel 10 can include a mount flange 16 at the disc end 12 extending radially inward from a disc face 18 for mounting the vehicle wheel 10 to a wheel hub (not shown). The mount flange 16 can include one or more bolt holes 20 extending there through for bolting or otherwise fastening the vehicle wheel 10 to the wheel hub. As shown in FIGS. 1, 3 and 4, the mount flange 16 can include a substantially planar outer face 22 for providing a stable bearing surface for engagement with one or more wheel nuts of one or more bolts when the vehicle wheel 10 is bolted to the wheel hub. As shown in FIGS. 2 and 4, the mount flange 16 can also include a substantially planar inner face 24 for providing a stable bearing surface for engagement with the wheel hub when the vehicle wheel 10 is bolted to the wheel hub.

The vehicle wheel 10 can also include a wheel rim 26 having an annular shape extending between the disc face 18 and the open end 14, and having a rim outer or tire surface 28 contoured to engage a tire disposed thereon, and a rim inner surface 30 opposite the rim outer surface 28. A stiffener rib 32 (FIG. 2) may be formed on and extend radially inward from the rim inner surface 30 proximate the open end 14. It will be apparent to those skilled in the art in view of this disclosure that other vehicle wheel configurations can be used in accordance with various embodiments. For example, in some embodiments (FIGS. 15a-15c), the stiffener rib 32 may be a separate component that is attached to the rim inner surface 30 of the wheel rim 26 with an appropriate attachment mechanism, such as welds, adhesive or the like, instead of being integrally formed with the wheel rim 26 as a single unitary component. As another example, in some embodiments (not shown), the mount flange 16 and the disc face 18 can be positioned between the two ends 12, 14 of the vehicle wheel 10 inward of the disc end 12.

As further shown in FIGS. 1, 3 and 4, the disc face 18 extends substantially conically between the mount flange 16 and the wheel rim 26 for providing a transition and structural support between the wheel rim 26 and the mount flange 16. However, it will be apparent in view of this disclosure that the disc face 18 may not be conical and can instead extend radially between the mount flange 16 and the wheel rim 26. The disc face 18 can include one or more hand holes 34 extending there through for permitting handling of the vehicle wheel 10, for providing cooling ventilation to a brake or brakes proximate the vehicle wheel 10, and/or for providing accessibility to a valve hole 36 (FIGS. 3 and 4) for inflation and valve installation. Although the disc face 18 is shown in FIGS. 1-4 as having 10 hand holes 34, it will be apparent that any appropriate number and/or size and/or shape for the hand holes 34 can be used.

The wheel rim 26 in accordance with the present disclosure can be configured for mounting a tire thereto. The rim outer side 28 of the wheel rim 26 can include a disc end flange 38 at the disc end 12, an open end flange 40 at the open end 14, a first angle wall 42 extending from the disc end flange 38 toward the open end flange 40, a second angle wall 44 extending from the open end flange 40 toward the disc end flange 38, and a drop well 46 connecting the first angle wall 42 to the second angle wall 44. The valve hole 36 of the wheel rim 26 can extend through the first angle wall 42, the second angle wall 44 or the drop well 46 so that an inflation valve (not shown) is conveniently accessible through the open end 14. The first angle wall 42, the second angle wall 44 and the drop well 46 can be sized and shaped to have a tire side profile geometry conforming to the Tire and Rim Association Standard for drop center rims and flat base rims. The valve hole 36 can be any size, shape, configuration and orientation suitable for installation of an inflation valve therein.

The disc end flange 38 and the open end flange 40 can each generally be sized and shaped to have a profile geometry on the rim outer surface 28 of the wheel rim 26 conforming to the Tire and Rim Association Standard for drop center rims and flat base rims. In some embodiments, particular profiles of the tire side and the inner side of the disc end flange 38 and the open end flange 40 can be configured within the Tire and Rim Association Standard for drop center rims and flat base rims to assist in achieving desired load ratings and tire pressure ratings at a reduced weight without increasing the risk of the tire demounting from the wheel rim 26. In alternative embodiments, the disc end flange 38 and the open end flange 40 can include different tire side and/or inner side profile patterns while conforming to the Tire and Rim Association Standards.

The stiffener rib 32 on the rim inner surface 30 of the wheel rim 26 extends radially inward from the wheel rim 26. In some embodiments, the stiffener rib 32 can extend circumferentially around the rim inner surface 30 of the wheel rim 26 for stiffening the wheel rim 26. It will be apparent in view of the present disclosure that, in some embodiments, one or more additional ribs can be included. For example, in an embodiment (not shown) as described above wherein the disc face 18 and mount flange 16 are positioned between the disc end 12 and the open end 14 of the wheel rim 26, one stiffener rib 32 can be included on either side of the disc face 18 proximate each end 12, 14 of the wheel rim 26.

It will further be apparent in view of this disclosure that the stiffener rib 32 can be formed in any size and/or shape that is compliant with brake clearance requirements and imparts a desired increase in second moment of area to the vehicle wheel 10 to support a desired reduced weight of the vehicle wheel 10. FIGS. 5a-5g illustrate various alternative stiffener ribs 32a-32g having varying cross-sectional geometries that may be integrated with the wheel rim 26 depending on the design requirements for a particular implementation. Each stiffener rib 32a-32g has a rib outward face 50a-50g, respectively, facing the open end 14 of the wheel rim 26, and a rib inward face 52a-52g, respectively, opposite the corresponding rib outward face 50a-50g. A rib inner edge 54a-54g of each stiffener rib 32a-32g defines a rib inner diameter IDrib (FIG. 4) that is less than an open end flange inner diameter IDf (FIG. 4) of the open end flange 40. The rib outward faces 50a-50g, the rib inward faces 52a-52g and the rib inner edges 54a-54g have varying shapes to change the cross-sectional geometries of the stiffener ribs 32a-32g as shown in FIGS. 5a-5g. Within the context of aerodynamic wheel cover assemblies in accordance with the present disclosure described herein, cover mounting mechanisms can be configured to engage the various stiffener ribs 32a-32g and other stiffener rib shapes to retain the wheel cover assemblies on the wheel rims 26.

As discussed above, the shape of the wheel rim 26 and the outboard open end 14 define a cavity within the wheel rim 26 and create an aerodynamic discontinuity that causes turbulence in the airstream flow past the side of the vehicle. The turbulence creates unwanted noise and drag that are undesirable and can reduce the fuel efficiency of the vehicle. Aerodynamic wheel cover assemblies in accordance with the present disclosure are mounted to the wheel rim 26 over the open end 14 to present a more continuous surface to the airstream flow and reduce turbulence in the flow. The wheel cover assemblies include cover mounting mechanisms that engage the stiffener rib 32 to hold the wheel cover assemblies in place. The cover mounting mechanisms may have generic configurations that can engage a subset of the stiffener ribs 32a-32g or stiffener ribs 32 having other cross-sectional shapes, or may have custom configurations that can engage a specific one or few of the stiffener ribs 32a-32g. The following examples illustrate the aerodynamic wheel cover assembly embodiments with particular stiffener ribs 32, but those skilled in the art will understand that shape variations can be made to match other stiffener rib shapes. Such variations are contemplated by the inventors.

First Embodiment

Figure 6A:
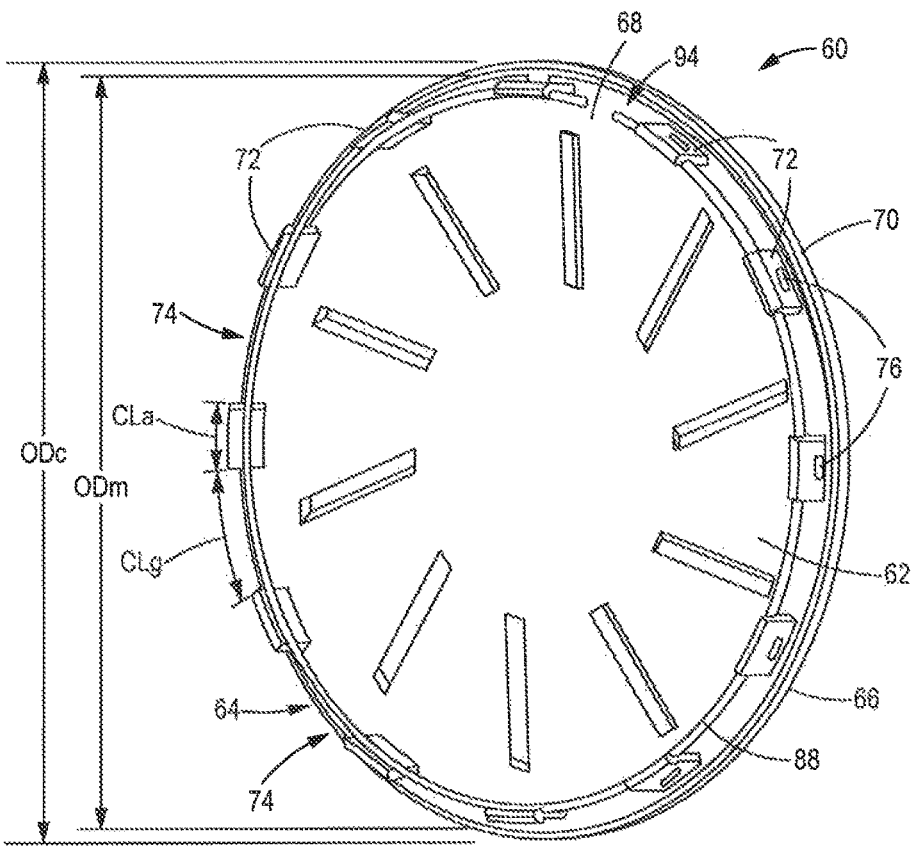
FIG. 6a is an isometric view of a first embodiment of a wheel cover assembly in accordance with the present disclosure that is mountable on the wheel rim of FIG. 1.
Figure 6B:
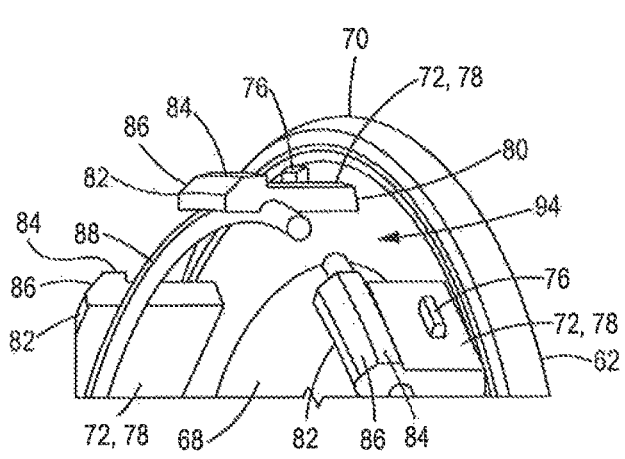
Figure 6C:
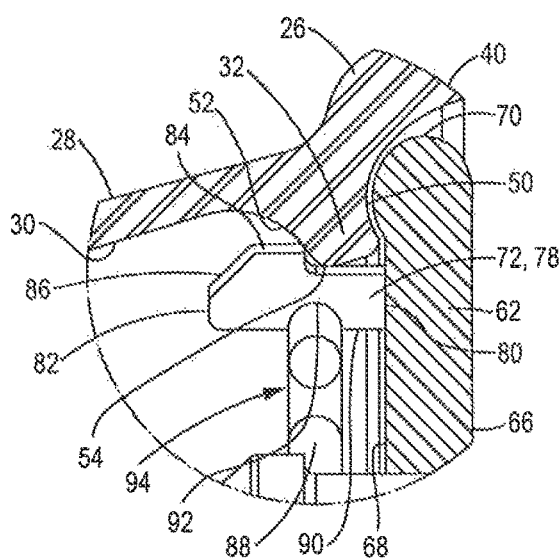

FIGS. 6a-6c illustrate a first embodiment of a wheel cover assembly 60 in accordance with the present disclosure. The wheel cover assembly 60 as illustrated includes a cover body 62 and a cover mounting mechanism 64. The cover body 62 has a circular shape, a cover body outer surface 66 (FIG. 6c), and a cover body inner surface 68 opposite the cover body outer surface 66. A cover body outer edge 70 has a cover body outer diameter ODc that is less than the open end flange inner diameter IDf so that the cover body 62 can be inserted through the open end flange 40, and is greater than the rib inner diameter IDrib so that the cover body 62 cannot pass through the stiffener rib 32. The cover body 62 can be fabricated from any appropriate material or combination of materials, such as metals, plastics, polymers, ceramics, rubber or the like, to achieve desired functional and aesthetic properties. In particular embodiments, the cover body 62 may be formed from aluminum, stainless steel, chrome-plated plastic, acrylonitrile butadiene styrene (ABS) plastics, and the like. Moreover, the cover body outer surface 66 can be configured or treated to provide desired functional performance (e.g., aerodynamic properties that minimize drag) and aesthetic appearance when installed on the vehicle wheel 10. Surface treatments can include surface finishing such as Dura-Bright® surface finishing, surface texturing, application of paint, or other coating, or the like.

The cover mounting mechanism 64 of the wheel cover assembly 60 includes rib engaging elements in the form of a plurality of locking arms 72 extending from the cover body inner surface 68 and circumferentially spaced about the cover body inner surface 68 proximate the cover body outer edge 70. Each locking arm 72 may have a locking arm circumferential length CLa (FIG. 6a) and be separated from each adjacent locking arm 72 by a locking arm gap 74 having a gap circumferential length CLg. In the illustrated embodiment, the gap circumferential length CLg is greater than the locking arm circumferential length CLa, but the circumferential links CLa, CLg could be equal or the locking arm circumferential length CLa may be greater than the gap circumferential length CLg depending on the implementation. The locking arms 72 may be attached to the cover body inner surface 68 with an appropriate attachment mechanism such as adhesive, welds, fasteners or the like. Alternatively, the cover body inner surface 68 may have a plurality of mounting tabs 76 extending from the cover body inner surface 68, with each mounting tab 76 corresponding to one of the locking arms 72 and being received by and engaging the locking arm 72 to secure the locking arm 72 to the cover body 62. In further alternatives as described below, the locking arms 72 may be integrally formed with the cover body 62.

As shown in greater detail in FIGS. 6b and 6c, each locking arm 72 has a locking arm body 78 extending from the cover body inner surface 68. The locking arm body 78 has a body proximal end 80 connected at the cover body inner surface 68 and extends to a body distal end 82 opposite the body proximal end 80. A locking arm detent 84 extends radially outward from the locking arm body 78 proximate the body distal end 82, and may include a detent camming surface 86 at the body distal end 82. The radially outer surfaces of the locking arm detents 84 define a cover mounting mechanism outer diameter ODm (FIG. 6a) that is greater than the rib inner diameter IDrib.

The wheel cover assembly 60 is installed on the wheel rim 26 by overcoming an overlap between the stiffener rib 32 and the locking arm detents 84. The detent camming surfaces 86 of the locking arm detents 84 are engaged by the rib outward face 50 of the stiffener rib 32 when the wheel cover assembly 60 is placed against the stiffener rib 32 and the locking arms 72 are in the normal locking position or rib engaging position shown in FIGS. 6a-6c. Application of additional force on the cover body outer surface 66 causes the locking arm bodies 78 to deflect radially inward toward a rib disengaging position with the cover mounting mechanism outer diameter ODm defined by the radial outer surfaces being less than the rib inner diameter IDrib as the locking arm detents 84 are forced past the stiffener rib 32. The locking arm gaps 74 allow the locking arms 72 to deflect inward without engaging each other. When the locking arm detents 84 move past the stiffener rib 32 and are disposed on the opposite side of the stiffener rib 32 from the cover body 62 at the rib inward face 52, restorative forces in a resilient material from which the locking arm bodies 78 are formed cause the locking arm bodies 78 to deflect radially outward toward the locking position. When the cover body inner surface 68 is proximate the rib outward face 50 as shown in FIG. 6c, the stiffener rib 32 is retained between the locking arm detents 84 and the cover body inner surface 68 to retain the wheel cover assembly 60 and the wheel rim 26. The wheel cover assembly 60 can be removed by prying the cover body 62 away from the open end flange 40 and forcing the locking arm detents 84 past the stiffener rib 32.

The locking force of the cover mounting mechanism 64 may be enhanced by biasing the locking arms 72 radially outward toward their locking positions. In one embodiment, an annular tension ring 88 may be installed on a radially inward side of the locking arms 72. The tension ring 88 may engage radial inner surfaces 90 of the locking arm bodies 78. Tension ring grooves 92 may be defined in the radial inner surfaces 90 to retain and align the tension ring 88 relative to the locking arms 72. The tension ring 88 is fabricated from a resilient material so that the tension ring 88 can deflect radially inward with the locking arms 72 due to engagement with the stiffener rib 32, and then deflect radially outward to force the locking arm body 78 into tighter engagement with the rib inner edge 54. The tension ring 88 may include a tension ring opening 94 to allow the inward deflection of the tension ring 88. As shown, the tension ring grooves 92 approximately radially align the tension ring 88 with the rib inner edge 54 or toward the side of the rib inward face 52 when the wheel cover assembly 60 is installed on the wheel rim 26. Those skilled in the art will understand that other tensioning mechanisms may be implemented with the wheel cover assembly 60 in accordance with the present disclosure, and such alternatives are contemplated by the inventors.

Second Embodiment

Figure 7A:
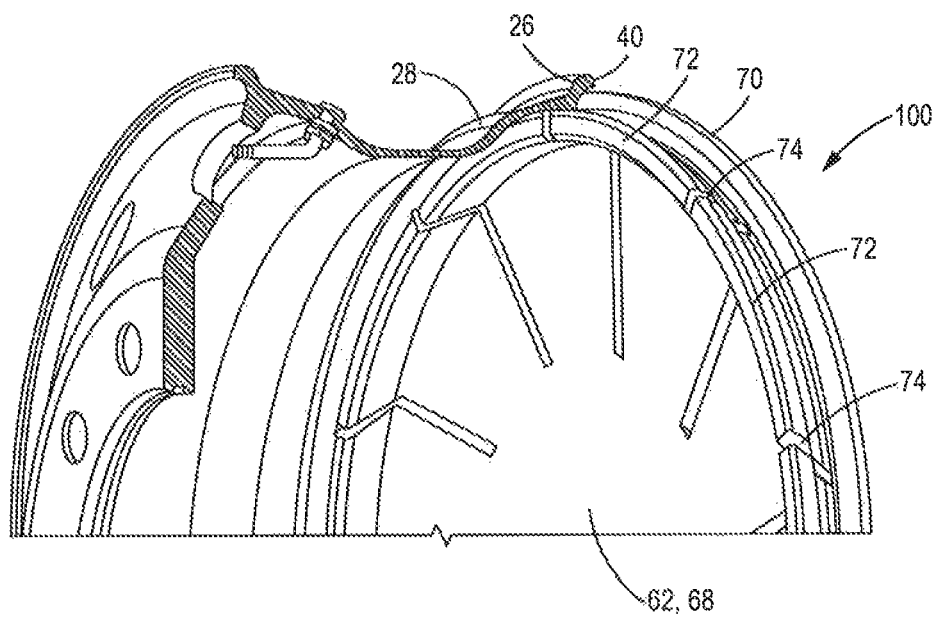
FIG. 7a is an enlarged isometric view of a portion of the wheel rim of FIG. 1 and a second embodiment of a wheel cover assembly in accordance with the present disclosure that is mountable on the wheel rim of FIG. 1.
Figure 7B:
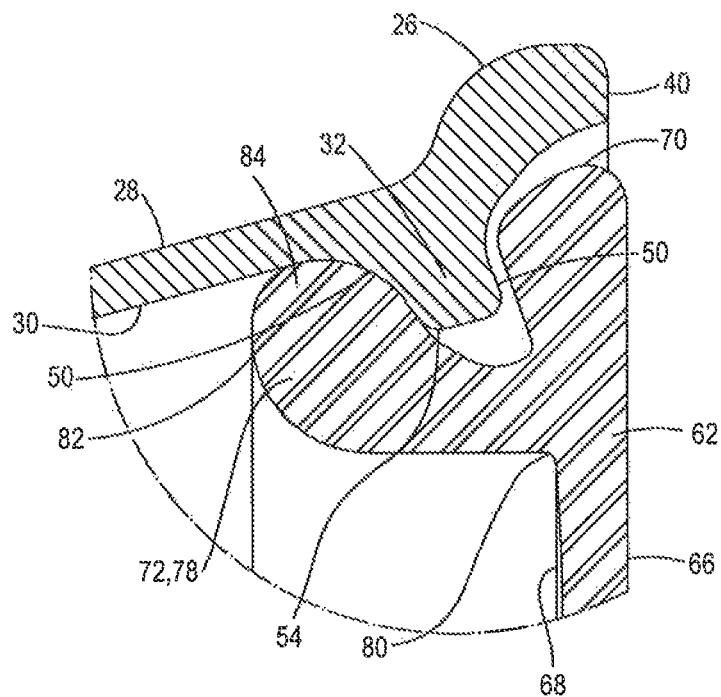

FIGS. 7a and 7b illustrate a modification of a wheel cover assembly 100 where the cover body 62 and the locking arms 72 of the cover mounting mechanism 64 are integrally formed as a single unitary component. In this embodiment and others illustrated and described herein, similar structures are identified with the same reference numerals. The integral cover body 62 and the locking arms 72 may be fabricated from a material that is resilient enough to allow the locking arms 72 to deflect radially inward, while at the same time having sufficient stiffness to prevent the wheel cover assembly 100 from detaching from the stiffener rib 32 under normal operating conditions for the vehicle wheel 10. For example, the cover body 62 and the locking arms 72 may be molded from an elastomeric material, including polymers, plastics and rubber (e.g., heavy durometer rubber).

The wheel cover assembly 100 illustrates additional variations of the wheel cover assembly 60. For example, the tension ring 88 is omitted in the illustrated embodiment, but the tension ring 88 or an alternative tensioning mechanism could be included if needed. Further, the locking arms 72 in the wheel cover assembly 100 have a locking arm circumferential length CLa that is greater than the gap circumferential length CLg of the locking arm gaps 74 there between. The locking arm gaps 74 are still large enough to prevent the locking arms 72 from engaging each other when the locking arms 72 deflect radially inward during installation.

Third Embodiment

Figure 8C:
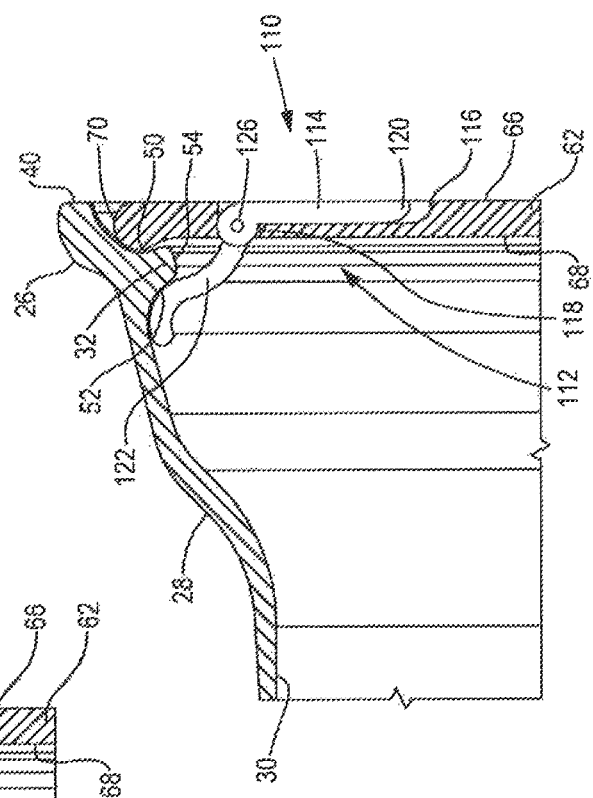
FIG. 8c is the enlarged view of FIG. 8b with the locking latch in a latch locked position.
Figure 8B:
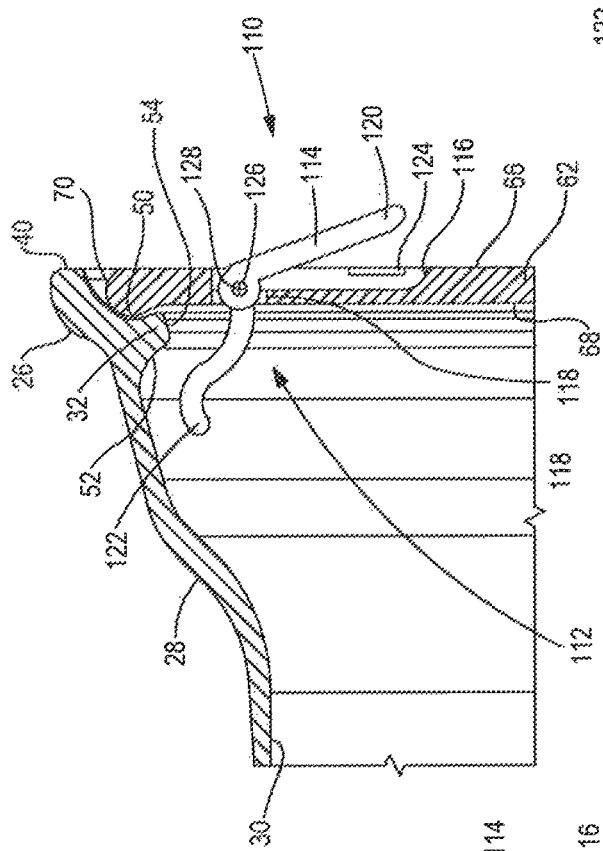
FIG. 8b is an enlarged view of a portion of the wheel rim of FIG. 1 and a corresponding portion of the wheel cover assembly of FIG. 8a with a locking latch in a latch unlocked position.
Figure 8A:
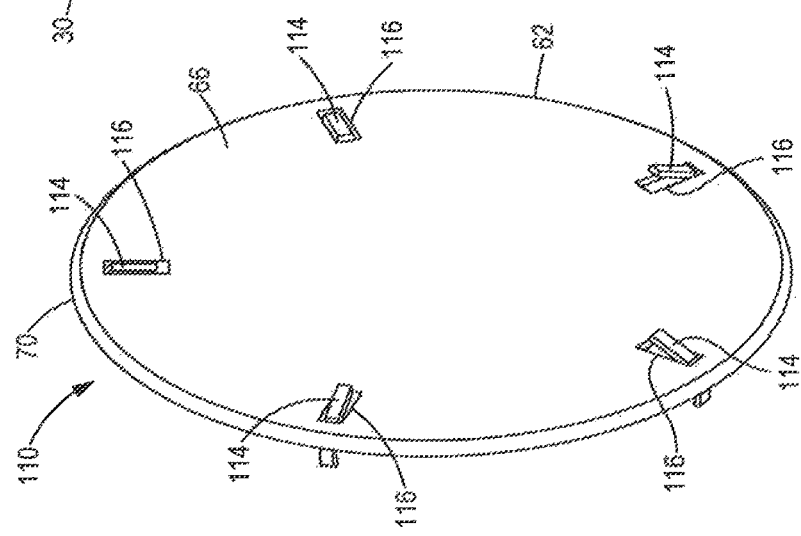
FIG. 8a is an isometric view of a third embodiment of a wheel cover assembly in accordance with the present disclosure that is mountable on the wheel rim of FIG. 1.

FIGS. 8a-8c illustrate an alternative embodiment of a wheel cover assembly 110 formed by the cover body 62 and a cover mounting mechanism 112 with rib engaging elements in the form of a plurality of locking latches 114. The cover body 62 is modified to include a plurality of latch recesses 116 defined in the cover body outer surface 66 and spaced circumferentially about the cover body outer surface 66 proximate the cover body outer edge 70 as shown in FIG. 8a. Each of the latch recesses 116 includes a latch opening 118 (FIGS. 8b and 8c) extending through the cover body 62 from the corresponding latch recess 116 to the cover body inner surface 68. Each locking latch 114 is installed in a corresponding one of the latch recesses 116. The locking latch 114 includes a latch arm 120 on the side of the cover body outer surface 66 of the cover body 62, and a latch finger 122 extending through the latch opening 118 to the cover body inner surface 68. The locking latches 114 are operatively connected to the cover body 62 so that the locking latches 114 move between a latch unlocked or rib disengaging position (FIG. 8b) and a latch locked or rib engaging position (FIG. 8c). In the latch unlocked position, the latch finger 122 does not engage the stiffener rib 32 when the cover body inner surface 68 is facing and engaging the rib outward face 50. With the locking latches 114 in their latch unlocked positions, the cover mounting mechanism outer diameter ODm defined by the latch fingers 122 is less than the rib inner diameter IDrib so that the latch fingers 122 can be inserted past the stiffener rib 32. Once the cover body 62 is in place as shown in FIG. 8b, the locking latches 114 can be moved to the latch locked position of FIG. 8c where the latch fingers 122 engage the rib inward face 52 of the stiffener rib 32 to capture the stiffener rib 32 between the latch fingers 122 and the cover body inner surface 68. The latch recesses 116 may include a latch locking mechanism or surface contour 124 that engages the latch arms 120 in the latch locked position to prevent the locking latches 114 from moving to the latch unlocked position during normal operation of the vehicle and detaching the wheel cover assembly 110 from the wheel rim 26.

In the illustrated embodiment, each locking latch 114 is attached to the cover body 62 by a latch pivot pin 126 that creates a locking latch axis 128 about which the locking latch 114 rotates between the latch unlocked position and the latch locked position. The locking latch axis 128 lies within a plane of the cover body 62 so that the locking latches 114 rotate as shown. In alternative embodiments, the latch recesses 116 and connections of the locking latches 114 may be modified so that the locking latches 114 rotate about locking latch axes 128 that are angled/orthogonal (e.g., perpendicular) relative to the plane of the cover body 62. In other embodiments, the locking latches 114 and the latch recesses 116 may be configured so that the locking latches 114 is slidably connected to the cover body 62 and move through a linear path between the latch unlocked positions and the latch locked positions. Other connection arrangements where the locking latches 114 move through linear, angled, circular or more complex paths of motion are contemplated.

Fourth Embodiment

Figure 9A:
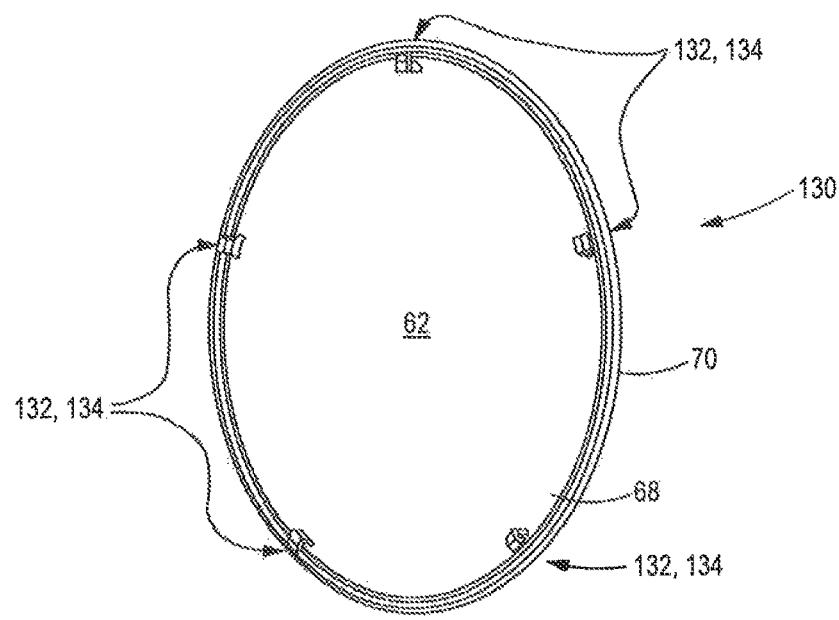
FIG. 9a is an isometric view of a fourth embodiment of a wheel cover assembly in accordance with the present disclosure that is mountable on the wheel rim of FIG. 1.
Figure 9B:
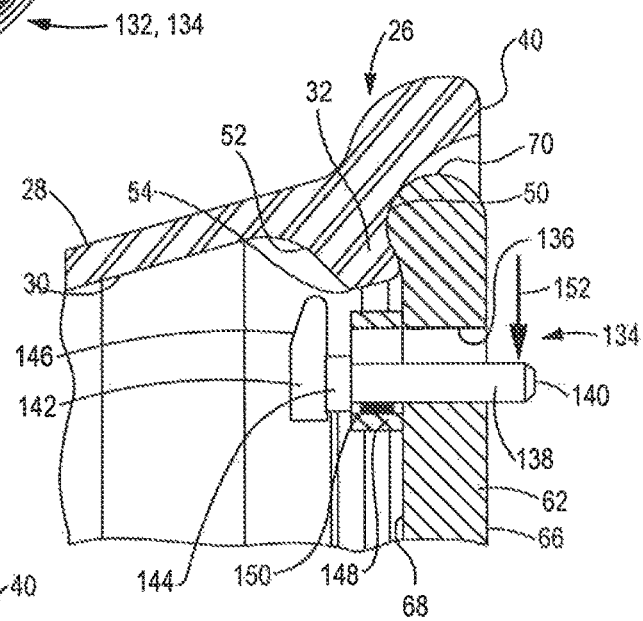
FIG. 9b is an enlarged view of a portion of the wheel rim of FIG. 1 and a corresponding portion of the wheel cover assembly of FIG. 9a with a latching pin assembly in a latching pin unlocked position.
Figure 9C:
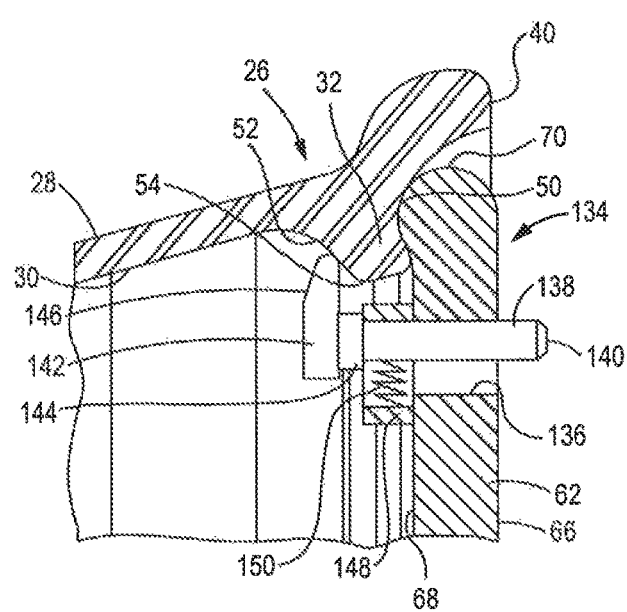
FIG. 9c is the enlarged view of FIG. 9b with the latching pin assembly in a latching pin locked position.

FIGS. 9a-9c illustrate a further alternative embodiment of a wheel cover assembly 130 including the cover body 62 and a cover mounting mechanism 132 with rib engaging elements in the form of a plurality of latching pin assemblies 134. The cover body 62 has a plurality of latching pin slots 136 spaced circumferentially about the cover body outer surface 66 proximate the cover body outer edge 70. Each of the latching pin slots 136 extend through the cover body 62 from the cover body outer surface 66 to the cover body inner surface 68 as shown in FIGS. 9b and 9c, and is elongated in the radial direction. Each latching pin assembly 134 is installed at a corresponding one of the latching pin slots 136. The latching pin assembly 134 includes a rib engaging element in the form of a latching pin 138 extending through the latching pin slot 136 with a latching pin tab end 140 extending from the cover body outer surface 66. A latching pin finger 142 is coupled to the latching pin 138 at a latching pin finger end 144 opposite the latching pin tab end 140, and may include a finger camming surface 146 on an inward side opposite the latching pin finger end 144. The radially outer ends of the latching pin fingers 142 may define the cover mounting mechanism outer diameter ODm.

The latching pin assemblies 134 in the illustrated embodiment further include latching pin mounting brackets 148 mounted to the cover body inner surface 68 proximate the corresponding latching pin slots 136. Each latching pin mounting bracket 148 receives the corresponding latching pin 138 and constrains the latching pin 138 to move between a latching pin unlocked or rib disengaging position (FIG. 9b) and a latching pin locked or rib engaging position (FIG. 9c). A latching pin spring 150 disposed within the latching pin mounting bracket 148 engages the latching pin 138 and imparts a biasing force biasing the latching pin 138 radially outward toward the latching pin locked position. The latching pin slots 136 and/or the latching pin mounting brackets 148 may also orient the latching pins 138 so the latching pin fingers 142 extend radially outward as shown in FIGS. 9b and 9c.

In the latching pin unlocked position, the latching pin 138 is displaced radially inward against the biasing force of the latching pin spring 150. The radial movement can be caused by engagement of the finger camming surface 146 with the rib outward face 50, or by a force as indicated by an arrow 152 in FIG. 9b applied to the latching pin tab end 140 of the latching pin 138. When fully retracted, the latching pin finger 142 does not engage the stiffener rib 32 when the cover body inner surface 68 is facing and engaging the rib outward face 50. With the latching pins 138 in their latching pin unlocked positions, the cover mounting mechanism outer diameter ODm defined by the latching pin fingers 142 is less than the rib inner diameter IDrib so that the latching pin fingers 142 can be inserted past the stiffener rib 32. Once the cover body 62 is in place as shown in FIGS. 9b and 9c, the force 152, if applied, can be removed and the latching pin fingers 142, which are disposed inward of the rib inward face 52, can move radially outward due to the biasing force of the latching pin spring 150 to the latching pin locked position of FIG. 9c. In the latching pin locked position, the latching pin fingers 142 engage the rib inward face 52 to retain the stiffener rib 32 between the latching pin fingers 142 and the cover body inner surface 68.

Fifth Embodiment

Figure 10:
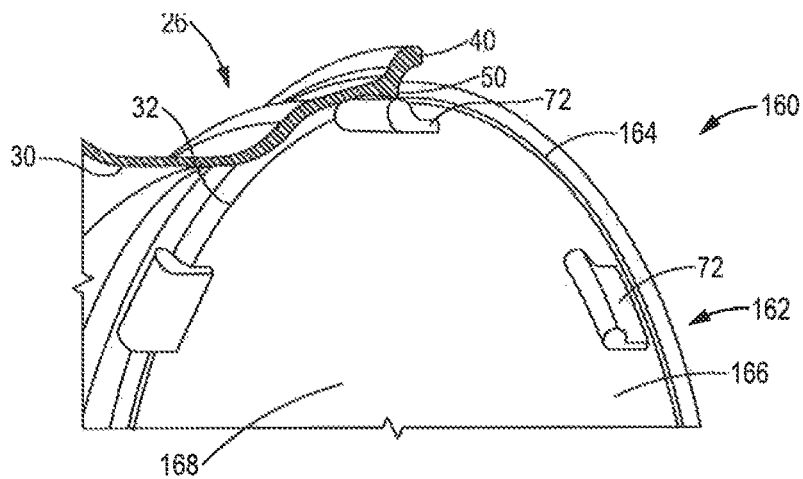
FIG. 10 is an enlarged isometric view of a portion of the wheel rim of FIG. 1 and a fifth embodiment of a wheel cover assembly in accordance with the present disclosure that is mountable on the wheel rim of FIG. 1.

FIG. 10 illustrates an alternative embodiment of a wheel cover assembly 160 that is generally similar in configuration and function to the wheel cover assemblies 60, 100 discussed above. However, the wheel cover assembly 160 has a cover body 162 having a multi-piece construction. The cover body 162 includes an annular cover support ring 164 defining an outer perimeter and the cover body outer diameter ODc, and a flexible body member 166 stretched over and secured to the cover support ring 164. The flexible body member 166 may be formed stretchable, pliable or resilient material, such as cloth materials, fabric materials, canvas materials, polymer-based materials, rubbers or the like. The flexible body member 166 is attached to the cover support ring 164 with sufficient tension that the flexible body member 166 does not flap and create unwanted noise when the vehicle travels at highway speeds. The locking arms 72 may be attached to a cover body inner surface 168 at the cover support ring 164, the flexible body member 166, or both, and extend outward from the cover body inner surface 168. The wheel cover assembly 160 may be installed and removed in a similar manner as the wheel cover assemblies 60, 100 as discussed above.

Sixth Embodiment

Figure 11A:
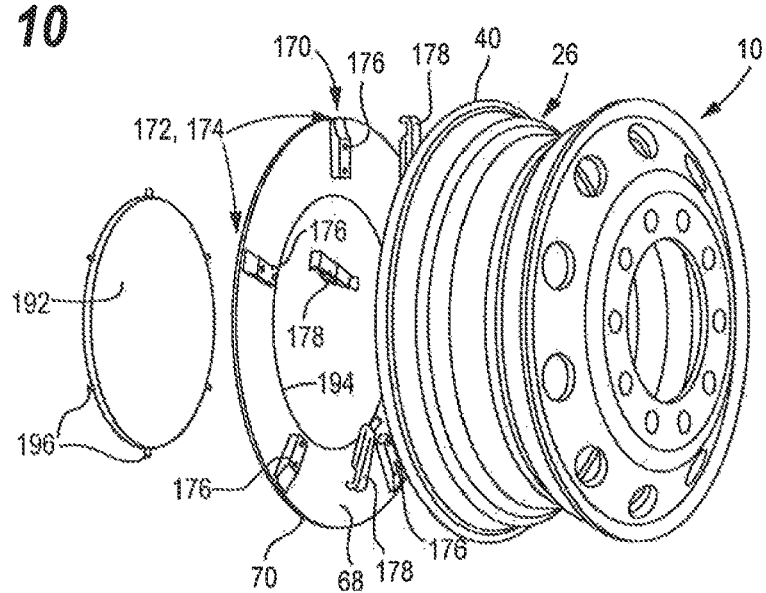
FIG. 11a is a partially exploded view of the wheel rim of FIG. 1 and a sixth embodiment of a wheel cover assembly in accordance with the present disclosure that is mountable on the wheel rim of FIG. 1
Figure 11B:
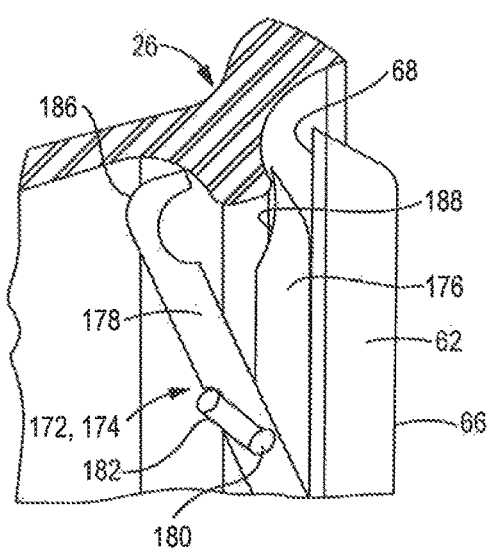
FIG. 11b is an enlarged view of a portion of the wheel rim of FIG. 1 and a corresponding portion of the wheel cover assembly of FIG. 11a mounted to the wheel rim.

FIGS. 11a and 11b illustrate an alternative embodiment of a wheel cover assembly 170 in which a cover mounting mechanism 172 has rib engaging elements in the form of a plurality of locking latches 174 disposed within the wheel rim 26 and the cover body 62 when the wheel cover assembly 170 is installed on the vehicle wheel 10. This arrangement contrasts with the wheel cover assemblies 110, 130 where the latch arms 120 and the latching pins 138, respectively, are accessible from the exteriors of the wheel cover assemblies 110, 130.

The locking latches 174 are circumferentially spaced about the cover body 62 proximate the cover body outer edge 70, and include a latch base 176 mounted to the cover body inner surface 68. A latch arm 178 is pivotally mounted on the latch base 176 by a latch pivot pin 180 that defines a latch axis about which the latch arm 178 rotates. A latch spring 182 is coupled between the latch base 176 and the latch arm 178, and provides a biasing force rotating the latch arm 178 toward a latch locked or rib engaging position (FIG. 11b). The latch arm 178 includes a latch arm tab 184 at a radially inward end and a latch arm finger 186 at a radially outward end. The latch arm tab 184 may be shaped to be engaged by an installer's finger to apply force to rotate the latch arm 178 toward a latch unlocked or rib disengaging position against the force of the latch spring 182. The latch arm finger 186 is configured to engage the rib inward face 52 of the stiffener rib 32 and capture the stiffener rib 32 between the latch arm finger 186 and a rib engaging surface 188 of the latch base 176 when the locking latch 174 is in the latch closed position.

In the latch unlocked position, the latch arm finger 186 does not engage the stiffener rib 32 when the cover body inner surface 68 is facing the stiffener rib 32 and the rib engaging surface 188 is engaging the rib outward face 50. If all the locking latches 174 are opened to their latch unlocked positions, the cover mounting mechanism outer diameter ODm defined by the latch arm fingers 186 is less than the rib inner diameter IDrib so that the latch arm fingers 186 can be inserted past the stiffener rib 32. Once the cover body 62 is in place as shown in FIG. 11b, the latch arm tabs 184 are released so that the latch arms 178 can rotate under the biasing force of the latch springs 182 to the latch locked position of FIG. 11b where the latch arm fingers 186 engage the rib inward face 52 of the stiffener rib 32 to capture the stiffener rib 32 between the latch arm fingers 186 and the rib engaging surfaces 188.

Because the locking latches 174 are disposed within the wheel rim 26 when the wheel cover assembly 170 is installed, access to the interior of the wheel rim 26 may be provided by modifying the cover body 62 to have a two-piece construction including an annular cover outer ring 190 and a removable cover inner cap 192. The cover outer ring 190 may include a cover opening 194 that is shaped to match the shape of the cover inner cap 192. During installation, the cover body 62 may be positioned within the open end flange 40 without the cover inner cap 192 attached at the cover opening 194 to allow an installer to reach through the cover opening 194 and manipulate the locking latches 174 to engage the stiffener rib 32. A cap attachment mechanism 196 is provided to allow the cover inner cap 192 to snap in place in the cover opening 194 after the locking latches 174 engage the stiffener rib 32 to hold the wheel cover assembly 170 in place on the vehicle wheel 10.

As with the locking latches 114 discussed above, the configuration of the locking latches 174 may be varied to achieve a desired path of motion for the latch arms 178 between the latch unlocked position and the latch locked position. In the illustrated embodiment, the locking latch axis created by the latch pivot pin 180 may be parallel to the plane of the cover body 62 so that the latch arm 178 rotates as shown. In alternative embodiments, the latch bases 176 and the latch arms 178 of the locking latches 174 may be modified so that the latch arms 178 rotate about locking latch axes that are perpendicular to the plane of the cover body 62. In other embodiments, the latch bases 176 and the latch arms 178 may be configured so that the latch arms 178 are slidably connected to the latch bases 176 and move through a linear path between the latch unlocked positions and the latch locked positions. Other connection arrangements where the latch arms 178 move through linear, circular or more complex paths of motion are contemplated.

Seventh Embodiment

Figure 12A:
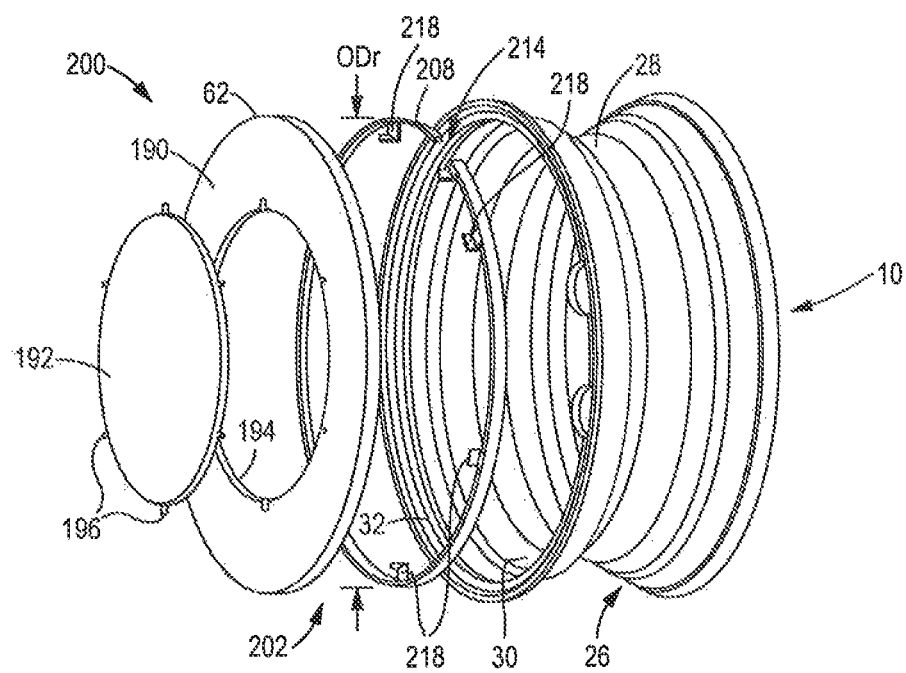
FIG. 12a is an exploded view of the wheel rim of FIG. 1 and a seventh embodiment of a wheel cover assembly in accordance with the present disclosure that is mountable on the wheel rim of FIG. 1
Figure 12B:
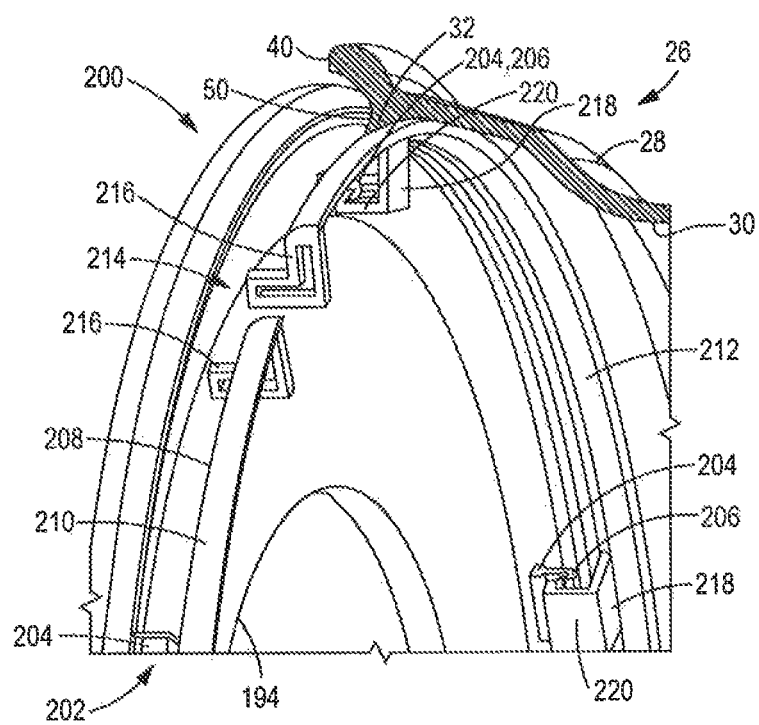
FIG. 12b is an enlarged view of a portion of the wheel rim of FIG. 1 and a corresponding portion of the wheel cover assembly of FIG. 12a mounted to the wheel rim.

FIGS. 12a and 12b illustrate a wheel cover assembly 200 having a cover mounting mechanism 202 with a multi-piece construction for attaching the cover body 62 to the vehicle wheel 10. In this embodiment, the cover body 62 may be similar to the configuration in the wheel cover assembly 170 with the cover outer ring 190 and the cover inner cap 192 to facilitate installation and removal of the wheel cover assembly 200. A plurality of cover clip arms 204 (FIG. 12b) extend from the cover body inner surface 68 and are circumferentially spaced about the cover outer ring 190 proximate the cover body outer edge 70. Each cover clip arm 204 terminates at a cover clip arm hook 206.

The cover mounting mechanism 202 further includes a snap-in retention ring 208 that is separate from the cover body 62 and functions as a rib engaging element. The retention ring 208 has an annular shape with a retention ring outer edge 210 and a retention ring inner edge 212. A portion of the retention ring 208 is cut away to form a compression opening 214. Each end of the retention ring 208 forming the compression opening 214 includes a ring pinch tab 216 extending radially inward from the retention ring inner edge 212. Prior to installation of the wheel cover assembly 200 as shown in FIG. 12a, the retention ring 208 is uncompressed and the retention ring outer edge 210 defines a retention ring outer diameter ODr that is greater than the rib inner diameter IDrib at a rib engaging position. The retention ring 208 may be fabricated from a resilient material so that forces may be applied to the ring pinch tabs 216 to reduce the circumferential length of the compression opening 214 and correspondingly reduce the retention ring outer diameter ODr to less than the rib inner diameter IDrib at a rib disengaging position so that the retention ring 208 may be inserted past the stiffener rib 32.

The retention ring 208 may further include a plurality of ring clip arms 218 extending radially inward from the retention ring inner edge 212 and circumferentially spaced about the retention ring inner edge 212. The ring clip arms 218 may correspond in number and position with the cover clip arms 204 on the cover body 62 so that the clip arms 204, 218 can align and engage during installation. To accomplish the engagement, the ring clip arms 218 further include ring clip arm hooks 220 extending longitudinally from the ring clip arms 218 and being configured to engage the cover clip arm hooks 206. As shown in FIG. 12b, the clip arm hooks 206, 220 radially overlap and are arranged so the cover clip arm hooks 206 a radially outward relative to the ring clip arm hooks 220 when engaged. However, the clip arm hooks 206, 220 could be rearranged to reverse their radial positions, or could be reconfigured for any other type of engagement that will secure the cover body 62 to the retention ring 208.

Installation of the wheel cover assembly 200 begins by pressing the ring pinch tabs 216 together to decrease the retention ring outer diameter ODr to less than the rib inner diameter IDrib. The retention ring 208 can then be inserted into the wheel rim 26 until the retention ring 208 is disposed inward of the stiffener rib 32. The ring pinch tabs 216 are released to allow the retention ring 208 to expand in the radial direction until the retention ring outer edge 210 engages the rim inner surface 30 at which time the retention ring outer diameter ODr is greater than the rib inner diameter IDrib. The rib inward face 52 engages the retention ring 208 to retain the retention ring 208 within the wheel rim 26.

With the retention ring to await installed, the cover body 62 can be attached to the vehicle wheel 10. In the illustrated embodiment, at least the cover clip arm hooks 206 are rounded to form camming surfaces that will engage the ring clip arm hooks 220. The cover body 62 may be oriented to align the cover clip arm hooks 206 with the corresponding ring clip arm hooks 220 and to bring the clip arm hooks 206, 220 into engagement, Application of additional force on the cover body outer surface 66 causes the cover clip arms 204 and/or the ring clip arms 218 to deflect radially as the cover clip arm hooks 206 are forced past the ring clip arm hooks 220. When the cover clip arm hooks 206 move past the ring clip arm hooks 220, restorative forces in resilient materials from which the clip arms 204, 218 are formed cause the clip arms 204, 218 to deflect radially toward their interlocking positions. When the clip arms 204, 218 are interlocked as shown in FIG. 12b, the cover body 62 will not be separated from the retention ring 208 and the wheel rim 26 under normal operating conditions for the vehicle. If the cover inner cap 192 was not installed with the cover outer ring 190 to provide the installer with access to the cover body inner surface 68 for purposes of ensuring alignment of the clip arms 204, 218, for example, the cover inner cap 192 may be snapped in place in the cover opening 194.

In an alternative installation method, the clip arms 204, 218 may be configured to interlock when the cover clip arms 204 are rotated into alignment with the ring clip arms 218. The retention ring 208 may be installed in the manner described above. The cover body 62 may be oriented with the cover clip arms 204 misaligned with respect to the ring clip arms 218, and inserted through the open end flange 40 until the cover body inner surface 68 is engaged by the rib outward face 50. Once in position, the cover body 62 may be rotated until the clip arms 204, 218 are aligned and the clip arm hooks 206, 220 are interlocking to secure the cover body 62 to the wheel rim 26.

Eighth Embodiment

FIGS. 13*a* and 13*b* illustrate an alternative embodiment of a cover body 290 having a cover opening 292 that can be implemented the various wheel cover assemblies disclosed herein to provide access to the interior of the wheel rim 26 when the wheel cover assembly is mounted to the vehicle wheel 10. The cover body 290 utilizes a mechanical iris design with a plurality of outer blades 294 and inner blades 296 (FIG. 13*b*) that can be alternately opened (FIG. 13*a*) and closed (FIG. 13*b*) to open and close the cover opening 292. The outer blades 294 are disposed on the side of the cover body outer surface 66 and the inner blades are disposed on the side of the cover body inner surface 68. The cover body 290 includes an annular cover outer ring 298 and an annular cover inner ring 300 rotatably mounted concentrically with the cover outer ring 298. The cover outer ring 298 has a plurality of radial blade guide slots 302 circumferentially spaced about the cover outer ring 298 that receive blade guide pins 304 attached to corresponding ones of the outer blades 294 and the inner blades 296. A blade pivot pin 306 for each of the blades 294, 296 is pivotally mounted to the cover inner ring 300 to allow the corresponding blade 294, 296 to pivot relative to the cover inner ring 300.

In the open position of FIG. 13*a*, the cover inner ring 300 has been rotated counterclockwise relative to the cover outer ring 298. As the cover inner ring 300 rotated to the open position, the blades 294, 296 rotate about the blade pivot pins 306 and the blade guide pins 304 slide radially outward in the blade guide slots 302 to expose the cover opening 292. To close the blades 294, 296 over the cover opening 292, the cover inner ring 300 is rotated clockwise to the closed position shown in FIG. 13*b*. The blade pivot pins 306 move with the cover inner ring 300, and the blade guide pins 304 are pulled radially inward within the blade guide slots 302 to rotate the blades 294, 296 over the cover opening 292.

Depending on the implementation, the blades 294, 296 can be opened and closed manually or automatically. In manual implementations, the installer of the wheel cover assembly or the owner or operator of the vehicle rotates the cover inner ring 300 between the open and closed positions as necessary for installation of the wheel cover assembly and access to the interior of the wheel rim 26. In alternative embodiments, the centripetal and/or centrifugal forces created when the vehicle wheel 10 rotates can be used to close the blades 294, 296 when the vehicle is traveling. The cover body 290 can be configured with springs that bias the blades 294, 296 to the open position when the vehicle wheel 10 is stationary or moving with a relative low angular velocity. As the angular velocity of the vehicle wheel 10 increases, centripetal and or centrifugal forces acting on the blades 294, 296 may cause the blades 294, 296 to rotate toward the closed position. If necessary, counterweights can be added that will displace radially outward to force the rotation of the blades 294, 296 to the closed position when the vehicle wheel 10 reaches a desired minimum angular velocity. As the vehicle wheel 10 slows, the biasing force of the springs will overcome the other forces and cause the blades 294, 296 to rotate back to the open position.

Ninth Embodiment

FIGS. 14*a* and 14*b* illustrate a further alternative embodiment of a wheel cover assembly 230 providing a permanent, rigid attachment of the cover body 62, 190 to the wheel rim 26 via the stiffener rib 32. The cover body 62, 190 may be circular as illustrated previously. Alternatively, the cover body 62, 190 may have a plurality of cover body fastening tabs 232 extending radially outward from the cover body outer edge 70 and circumferentially spaced about the cover body outer edge 70. The cover body fastening tabs 232 may define the cover body outer diameter ODc that is less than the open end flange inner diameter IDf and greater than the rib inner diameter IDrib. This configuration allows the cover body 62, 190 to be inserted through the open end flange 40 and have the cover body inner surface 68 engaged by the rib outward face 50 at the cover body fastening tabs 232.

Once the cover body 62, 190 is in place, any appropriate permanent fastening mechanism can be used to rigidly anchor the cover body 62, 190 to the stiffener rib 32. In one embodiment, an adhesive may be applied between the cover body fastening tabs 232 and the rib outward face 50. In alternative embodiments, a mechanical connection may be used to secure the cover body 62, 190. In the illustrated embodiment, each of the cover body fastening tabs 232 is rigidly secured to the stiffener rib 32 by a corresponding rivet 234. The rivets 234 may extend through a fastening tab hole 236 of the cover body 62, 190 and an aligning rib hole 238 of the stiffener rib 32. During the installation process, the cover inner cap 192 may be removed to allow access for attaching the rivets 234. Those skilled in the art will understand that other permanent or semi-permanent mechanical connection hardware may be used to secure the cover body fastening tabs 232 to the stiffener rib 32, and such connection hardware are contemplated by the inventors. Moreover, the cover body fastening tabs 232 may be omitted and the cover body outer diameter ODc of the cover body 62 may be greater than the rib inner diameter IDrib, with fastening tab holes 236 extending through the cover body 62, and the rivets 234 being installed therethrough.

With the cover body 62, 190 secured to the wheel rim 26 and the stiffener rib 32, the cover inner cap 192 can be attached at the cover opening 194 to the cover body 62, 190. The cover inner cap 192 may extend radially outward and have a cover cap outer diameter such that the cover inner cap 192 covers the rivets 234 and the cover body fastening tabs 232 to optimize the aerodynamics and the aesthetics of the wheel cover assembly. The cap attachment mechanism 196 may provide a removable attachment of the cover inner cap 192 so that the cover inner cap 192 may be removed to permit access to the interior of the wheel rim 26, or for replacement of the cover inner cap 192 if it is damaged. The cover inner cap 192 may be interchangeable with other cover inner caps 192 having different aerodynamic properties, surface treatments, coatings, colors, designs and other variations that a vehicle owner may want to install on the vehicle wheel 10.

Over time, technology develops for monitoring the performance of vehicles, vehicle wheels 10 and wheel rims 26. Such technology may be most effective when mounted to the wheel rim 26 and travel with the wheel rim 26 as the vehicle is operated. Where it is desired to provide the technology, the wheel cover assembly of FIGS. 14*a* and 14*b* may facilitate mounting the technology within the wheel rim 26 and providing access to the technology when necessary. The components of the technology may be mounted to the cover plate 62, 190 as an alternative to mounting the technology directly to the rim inner surface 30. The configuration of the cover plate 62, 190 can be modified as necessary to provide sufficient mounting surfaces and support for the technology within the wheel rim 26. The cover inner cap 192 may be configured to provide access to the components to allow for maintenance on the components or replacement of the components or a power source of the technology. Configurations of the cover plate 62, 190 and the cover inner cap 192 to facilitate installation and access to the technology components will vary based on the equipment being installed, and such configurations and modifications are contemplated by the inventors.

Tenth Embodiment

Figure 15:
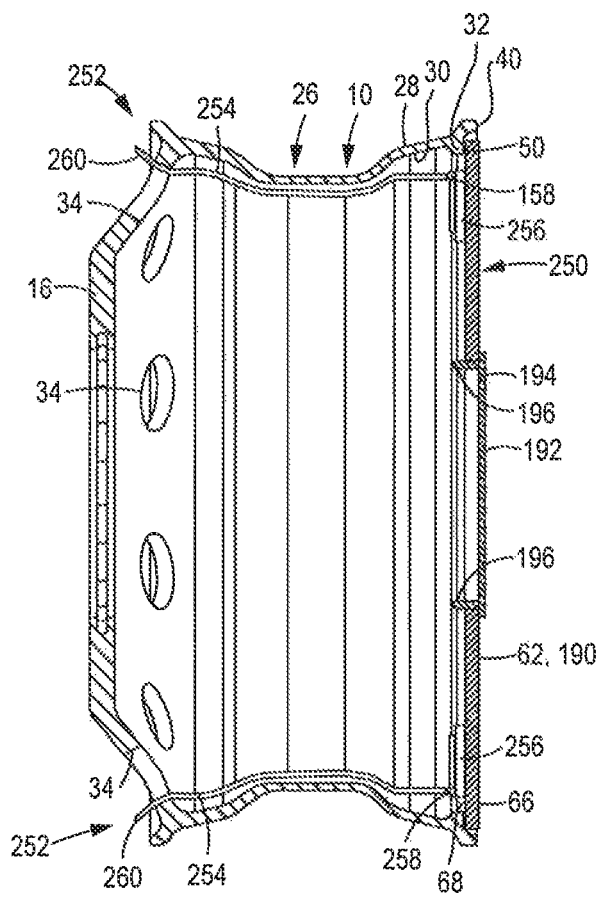
FIG. 15 is the cross-sectional view of the wheel rim of FIG. 4 with a tenth embodiment of a wheel cover assembly in accordance with the present invention mounted to the wheel rim.

FIG. 15 illustrates an example of an alternative embodiment of a wheel cover assembly 250 having a cover mounting mechanism 252 utilizing structures of the vehicle wheel 10 in addition to the stiffener rib 32 to secure the wheel cover assembly 250 to the vehicle wheel 10. In this embodiment, the hand holes 34 in the disc face 18 are engaged to retain the wheel cover assembly 250 while the stiffener rib 32 supports the cover body 62. The wheel cover assembly 250 may use the cover body 62 is previously described including the cover outer ring 190 and the cover inner cap 192. The cover mounting mechanism 252 may include hand hole engaging arms 254 mounted on the cover body inner surface 68. As shown, the cover mounting mechanism 252 includes two hand hole engaging arms 254 positioned on diametrically opposite sides of the cover body inner surface 68. However, additional hand hole engaging arms 254 may be used and be spaced about the cover body inner surface 68 proximate the cover body outer edge 70 to align with the corresponding hand holes 34.

The hand hole engaging arms 254 may be spring loaded to create an engagement force necessary to retain the wheel cover assembly 250 on the vehicle wheel 10. Each hand hole engaging arm 254 may have an engaging arm base 256 mounted on the cover body inner surface 68. The hand hole engaging arm 254 may be pivotally connected to the engaging arm base 256 for relative rotational movement. An engaging arm spring 258 is operatively connected between the hand hole engaging arm 254 and the engaging arm base 256. In the illustrated embodiment, the engaging arm spring 258 may bias the hand hole engaging arms 254 to rotate toward a radially outward disengaged position (not shown) that may extend beyond the cover body outer edge 70. In alternative embodiments, the engaging arm spring 258 may bias the hand hole engaging arm 254 to rotate in the opposite direction toward a radially inward disengaged position.

To install the wheel cover assembly 250, an installer may rotate the hand hole engaging arms 254 from the disengaged positions toward the engaged position shown in FIG. 15 where the hand hole engaging arms 254 extend outward from the cover body inner surface 68. With the hand hole engaging arms 254 rotated, engaging arm ends 260 may be inserted past the stiffener rib 32 and into the corresponding hand holes 34. The installer may gain access to the hand hole engaging arms 254 through the cover opening if needed to align the engaging arm ends 260 with the hand holes 34. The engaging arm ends 260 may have curved shapes allowing the engaging arm ends 260 to hook the edges of the hand holes 34. With the engaging arm ends 260 inserted, the cover body 62 is inserted through the open end flange 40 until the cover body inner surface 68 is engaged by the rib outward face 50. The cover inner cap 192 can also be snapped on to the cover outer ring 190 if necessary to complete the installation of the wheel cover assembly 250.

Eleventh Embodiment

Figure 16:
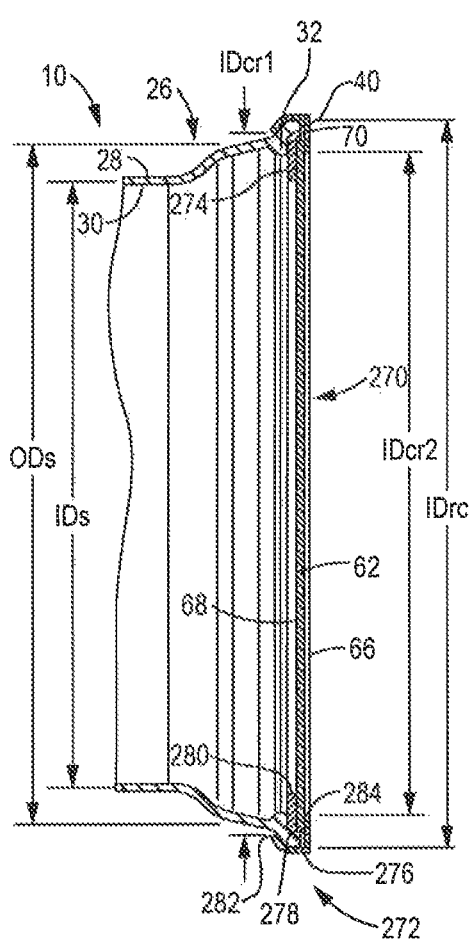
FIG. 16 is the cross-sectional view of the wheel rim of FIG. 4 with a eleventh embodiment of a wheel cover assembly in accordance with the present invention mounted to the wheel rim.

FIG. 16 illustrates a further alternative embodiment of a wheel cover assembly 270 having a cover mounting mechanism 272 with a multi-piece construction and utilizing structures of the vehicle wheel 10 in addition to the stiffener rib 32 to attach the cover body 62 to the vehicle wheel 10. In the illustrated embodiment, the wheel cover assembly 270 is mounted to the vehicle wheel 10 via engagement of the stiffener rib 32 and the open end flange 40. The cover mounting mechanism 272 includes an inner support ring 274 and an outer retainer ring 276. The inner support ring 274 is annular and has a support ring outer edge 278 defining a support ring outer diameter ODs that is less than the open end flange inner diameter IDf and greater than the rib inner diameter IDrib. A support ring inner edge 280 defines a support ring inner diameter IDs that is less than the rib inner diameter IDrib so that the support ring inner edge 280 extends radially inward relative to the rib inner edge 54 when the wheel cover assembly 270 is installed as shown in FIG. 16.

The outer retainer ring 276 is configured to snap onto the open end flange 40 and partially overlap the cover body 62. The outer retainer ring 276 is also annular and forms a channel when viewed in cross-section to facilitate attachment over the open end flange 40. The channel of the outer retainer ring 276 may have a ring channel inner diameter IDrc that is greater than the open end flange outer diameter ODf. A first retainer ring inner edge 282 may have a first retainer ring inner diameter IDrr1 that is less than the open end flange outer diameter ODf, and a second retainer ring inner edge 284 may have a second retainer ring inner diameter IDrr2 that is less than the open end flange inner diameter IDf and the cover body outer diameter ODc.

The wheel cover assembly 270 is installed on the vehicle wheel 10 by first inserting the inner support ring 274 into the open end 14 until the inner support ring 274 faces and engages the rib outward face 50. The cover body 62 is then inserted with the cover body inner surface 68 facing and engaging the inner support ring 274. The overlapping area between the inner support ring 274 and the cover body 62 provides additional support to the cover body 62 against forces pressing the cover body 62 inward into the wheel rim 26. The installation may be completed by snapping the first retainer ring inner edge 282 of the outer retainer ring 276 over the open end flange 40 so that the open end flange 40 is disposed within the channel of the outer retainer ring 276. The outer retainer ring 276 may be fabricated from a resilient material allowing the first retainer ring inner edge 282 to expand as it passes over the open end flange 40, and to return to its normal shape once past the open end flange 40. With the outer retainer ring 276 installed as shown, the second retainer ring inner edge 284 extends radially inward of the cover body outer edge 70 to retain the cover body 62 within the open end flange 40.

INDUSTRIAL APPLICABILITY

The wheel cover assemblies in accordance with the present disclosure provide a solution for covering the exposed cavity of the wheel rim 26. With the wheel cover assemblies installed, greater aerodynamic continuity across the outer wall of the tire mounted on the vehicle wheel 10 and the cover body outer surface 66. Turbulence in the airstream flow past the vehicle wheel 10 is reduced. Correspondingly, noise and drag created at highway speeds are reduced; the latter leading to improved fuel efficiency for the vehicle. Covering the cavity of the wheel rim 26 can also improve the appearance of the vehicle.

The various embodiments of the wheel cover assemblies provide cover mounting mechanisms that facilitate installation and removal of the wheel cover assemblies. Consequently, the wheel cover assemblies are readily removable for inspection and maintenance of the vehicle wheel 10, changing the tire, and cleaning the wheel cover assembly. The cover mounting mechanisms take advantage of the stiffener rib 32 extending inward from the rim inner surface 30 proximate the open end flange 40 and providing a mounting structure to which the cover body 62 can be mounted.

Wheel covers for existing wheel rims without stiffener ribs often attach to the central hub of the vehicle wheel. Varying hub designs, wheel offsets and wheel maintenance require unique equipment, adjustment and assembly to mount the wheel covers to the central hubs. By utilizing the integral stiffener rib 32 as the attachment point for the wheel cover assemblies in accordance with the present disclosure, many of the design and installation variables may be removed. Vehicles wheels and wheel cover assemblies can be supplied to original equipment manufacturers without the need for adjustment or complex assembly. New and replacement parts may not need to be customized for varying wheel offsets. Simple attachment to any integral stiffener rib 32 is facilitated.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A wheel cover assembly for a vehicle wheel having a wheel rim, the wheel cover assembly comprising:
    a cover body having
        a cover body outer surface,
        a cover body inner surface opposite the cover body outer surface, and
        a cover body outer edge having a cover body outer diameter that is greater than a rib inner diameter of a stiffener rib extending inward from a rim inner surface of the wheel rim and less than an open end flange inner diameter of an open end flange of the wheel rim;
    a cover mounting mechanism operatively connected to the cover body and
        having a locking position wherein the cover mounting mechanism engages the stiffener rib when the cover body inner surface is facing and engaging the stiffener rib and
        a cover locking position wherein the cover mounting mechanism engages the stiffener rib to retain the stiffener rib between the cover mounting mechanism and the cover body and secure the wheel cover assembly to the vehicle wheel,
        wherein the cover mounting mechanism comprises a plurality of locking arms extending from the cover body inner surface, wherein each locking arm comprises: a locking arm body extending from the cover body inner surface and having a body proximal end connected to the cover body inner surface, a body distal end opposite the body proximal end, and an inner surface between the body proximal end and the body distal end; and
        a tension ring, wherein the tension ring engages the inner surface of each locking arm body and biases the locking arm bodies radially outward.

2. The wheel cover assembly according to claim 1, wherein the plurality of locking arms is circumferentially spaced about the cover body inner surface proximate the cover body outer edge, wherein each locking arm comprises a locking arm detent extending radially outward from the locking arm body proximate the body distal end, wherein the locking arm detents define a cover mounting mechanism outer diameter that is greater than the rib inner diameter, and wherein the locking arm bodies deflect radially inward when the locking arm detents are engaged by the stiffener rib and deflect radially outward when the locking arm detents are disposed on an opposite side of the stiffener rib from the cover body so that the stiffener rib is retained between the locking arm detents and the cover body inner surface.

3. The wheel cover assembly according to claim 2, wherein the tension ring has an annular shape, and wherein the inner surface of each locking arm body includes a radial inner surface, and wherein the tension ring engages the radial inner surface of each locking arm body and biasing the locking arm bodies radially outward.

4. The wheel cover assembly according to claim 2, wherein the plurality of locking arms are integrally formed with the cover body as a single unitary component of the wheel cover assembly.

* * * * *